(12) United States Patent
Tseng et al.

(10) Patent No.: US 7,647,517 B2
(45) Date of Patent: *Jan. 12, 2010

(54) PCI EXPRESS SYSTEM AND METHOD OF TRANSITIONING LINK STATE INCLUDING ADJUSTING THRESHOLD IDLE TIME ACCORDING TO A REQUIREMENT OF DATA TRANSMISSION

(75) Inventors: Wen-Yu Tseng, Taipei (TW); Wei-Lin Wang Wang, Taipei (TW)

(73) Assignee: VIA Technologies, Inc., Taipei (TW)

( * ) Notice: Subject to any disclaimer, the term of this patent is extended or adjusted under 35 U.S.C. 154(b) by 513 days.

This patent is subject to a terminal disclaimer.

(21) Appl. No.: 11/403,853

(22) Filed: Apr. 14, 2006

(65) Prior Publication Data

US 2006/0265612 A1 Nov. 23, 2006

Related U.S. Application Data

(60) Provisional application No. 60/683,313, filed on May 23, 2005.

(30) Foreign Application Priority Data

Nov. 7, 2005 (TW) .............................. 94139010 A

(51) Int. Cl.
*G06F 1/32* (2006.01)
(52) U.S. Cl. .................. 713/320; 713/322; 713/323; 710/313
(58) Field of Classification Search ......... 713/320–324; 710/313
See application file for complete search history.

(56) References Cited

U.S. PATENT DOCUMENTS

| 4,763,296 | A | 8/1988 | Gercekci |
| 4,872,110 | A | 10/1989 | Smith et al. |
| 6,122,690 | A | 9/2000 | Nannetti et al. |
| 7,188,263 | B1* | 3/2007 | Rubinstein et al. ......... 713/300 |
| 7,287,096 | B2 | 10/2007 | Wunsch |
| 7,320,080 | B2* | 1/2008 | Solomon et al. ............ 713/320 |
| 7,383,457 | B1* | 6/2008 | Knight ....................... 713/323 |
| 2003/0123486 | A1 | 7/2003 | Lacey, III |
| 2004/0128576 | A1 | 7/2004 | Gutman et al. |
| 2004/0268169 | A1 | 12/2004 | Bashford et al. |
| 2005/0086549 | A1 | 4/2005 | Solomon et al. |
| 2005/0097378 | A1* | 5/2005 | Hwang ...................... 713/320 |

OTHER PUBLICATIONS

"PCI Express Base Specification, Revision 1.01a," PCI-SIG, Apr. 15, 2003.
"Marked-Up Version of PCI Express Base Specification, Revision 1.0" PCI-SIG, pp. 201, 267, 276-278, Apr. 15, 2003.

* cited by examiner

*Primary Examiner*—Thuan N Du
(74) *Attorney, Agent, or Firm*—Bacon & Thomas, PLLC

(57) ABSTRACT

A PCI Express system and a method of transitioning link state thereof. The PCI Express system includes an upstream component, a downstream component and a link. The upstream component and the downstream component transmit data to each other via the link. When at least one of the upstream component and the downstream component stops data transmission under a normal working state and if the system idle time period reaches a threshold idle time, then transiting the link into a second link state.

22 Claims, 3 Drawing Sheets

PCI EXPRESS SYSTEM AND METHOD OF TRANSITIONING LINK STATE INCLUDING ADJUSTING THRESHOLD IDLE TIME ACCORDING TO A REQUIREMENT OF DATA TRANSMISSION

This application claims the benefit of Provisional Application No. 60/683,313 filed May 23, 2005 and the benefit of Taiwan Application Serial No. 94139010 filed Nov. 7, 2005, the subject matters of which are incorporated herein by reference.

BACKGROUND OF THE INVENTION

1. Field of the Invention

The invention relates in general to a PCI (Peripheral Component Interconnect) Express system and a method of transitioning a power state thereof, and more particularly to a PCI Express system and a method of transitioning a link state (L-state) thereof.

2. Description of the Related Art

PCI (Peripheral Component Interconnect) interfaces are originally the mainstream of personal computers. With the progress of time, however, a higher transmission bandwidth required in future processors and output/input components has greatly exceeded the range of the PCI interface. A new generation of PCI Express has been disclosed to serve as the standard local input/output bus for various operation platforms. The maximum features include the enhancement of efficiency and the high one-way transmission rate of 2.5 GHz. Furthermore, the transmission rate can be increased as the number of lanes increases. For example, the transmission rate can be increased by four times when four lanes are used.

The ACPI (Advanced Configuration and Power Interface) defines the power state of the component in various states and is referred to as D-state (Device State). The PCI Express further defines the power state of a link between components, which is referred to as L-state (Link State). Each L-state and each D-state have a corresponding relationship.

The D0 state (Full-On) represents that the component is under a normal working state. When the component is under the D0 state, the link between the components is under the L0, L0s or L1 states.

The D1 state and D2 state are not obviously defined in ACPI. In general, the D2 state saves more power than the D0 and D1 states, but can hold the states of fewer components. The D1 state consumes more power than the D2 state, but can hold the states of more components. The D1 and D2 states correspond to the L1 state.

The D3 state (Off) represents a shutdown state and includes D3cold and D3hot states. When the components are under the D3cold state, it means that the main power is not supplied to the components. When the components are in the D3hot state, it means that the main power is supplied to the components. When the power states of the components are under the D3cold state, the links between the components correspond to the L2 state if an auxiliary power is supplied to the components; and the links between the components correspond to the L3 state if no power is supplied to the components. The D3hot state corresponds to the L1 state.

The L0 state represents that the power states of the links between the components are under the normal working state. When data is transmitted on the links between the components, if a short idle represented, the link can be entered to L0s state to decrease the power consumption.

When the links between the components are under the L1 state, the components have no working request, and the power requirement of the links between the components is decreased. At this time, the clock signal doesn't trigger, and the PLL (Phase Locked Loop) also pauses.

The L2 state and L3 state are the shutdown states. An auxiliary power exists under the L2 state, and no auxiliary power exists under the L3 state.

However, it is found that the power consumption can't be save due to the L0s state cannot be properly entered or entered more frequently from L0 state, and thus the object of power-saving cannot be really achieved.

SUMMARY OF THE INVENTION

The invention provides a PCI Express system and a method of transitioning link state thereof, wherein a threshold idle time can be adjusted such that the system can properly and timely transit the link state when idle. The invention provides a method of transitioning link state (L-state) between an upstream component and a downstream component. The method includes: detecting whether at least one of the upstream component and the downstream component stops data transmission when the link is under a first link state; if the data transmission is stopped and a threshold idle time is expired, then transiting the link into a second link state.

The invention also provides a data transmission system includes an upstream component, a downstream component and a link. The link is electrically connected between the upstream component and the downstream component and the upstream component and the downstream component respectively transmit data to each other via the link under a first link state which is a normal working state. When a time period of at least one of the upstream component and the downstream component stops the data transmission under the first link state reaches a threshold idle time, the link is transited to a second link state.

Other objects, features, and advantages of the invention will become apparent from the following detailed description of the preferred but non-limiting embodiments. The following description is made with reference to the accompanying drawings.

DETAILED DESCRIPTION OF THE INVENTION

In the specification of PCI Express, a hardware mechanism, ASPM (Active State Power Management), is used to handle the link state transiting from the L0s state to the L1 state.

Figure 1:
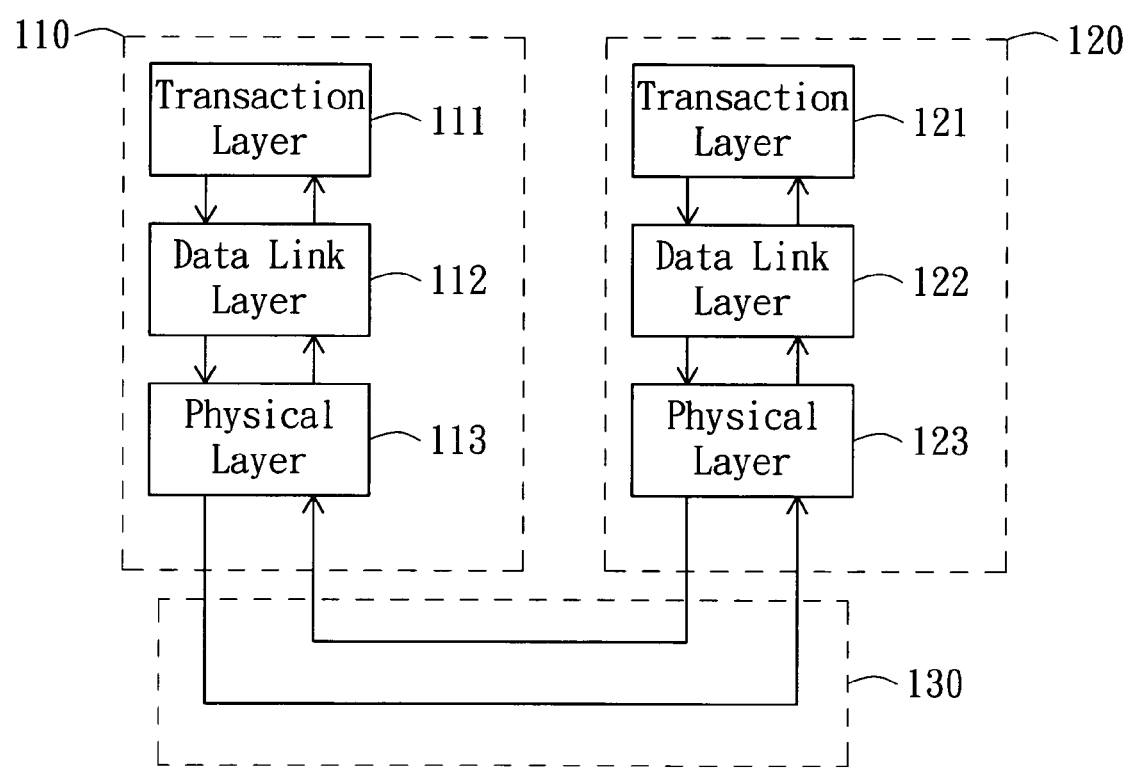
FIG. 1 is a block diagram showing a data transmission system of PCI Express according to a preferred embodiment of the invention.

FIG. 1 is a block diagram showing a data transmission system 100 of PCI Express according to an embodiment of the invention. Referring to FIG. 1, the data transmission system 100 includes an upstream component 110, a downstream component 120 and a link 130. The link 130 is electrically connected between the upstream component 110 and the downstream component 120.

The upstream component 110 includes a transaction layer (TL) 111, a data link layer (DLL) 112 and a physical layer (PHY) 113.

The transaction layer 111 generates and transmits a data packet to the data link layer 112, or receives the data packet from the data link layer 112. The transaction layer 111 also manages the flow controls between the transaction layer 111 and the components. The data packet received or generated by the transaction layer 111 is regarded as a transaction layer packet (TLP).

Data packets are transmitted between the data link layer 112 and the physical layer 113; and are also transmitted between the data link layer 112 and the transaction layer 111. The data link layer 112 receives the data packet and then provides the transaction layer packet to the transaction layer 111. Or the data link layer 112 receives the transaction layer packet outputted from the transaction layer 111 and then outputs the data packet to the physical layer 113. The data link layer 112 debugs during the above-mentioned operation in order to transmit the data packet stably. The data packet transmitted between the data link layer 112 and the physical layer 113 is regarded as a data link layer packet (DLLP).

The physical layer 113 undertakes the packet transmission via the link between the component 110 and the component 120. The physical layer 113 receives the packet from the component 120 and transfers the packet into a DLLP format, and then outputs the DLLP to the data link layer 112. The physical layer 113 also receives the DLLP from the data link layer 112, and then transmits the DLLP to the physical layer 123 of the component 120 via the link 130.

The downstream component 120 is similar to the upstream component 110 and also includes a transaction layer 121, a data link layer 122 and a physical layer 123. The operations of each layer have been described hereinabove, and detailed descriptions thereof will be omitted.

Figure 2:
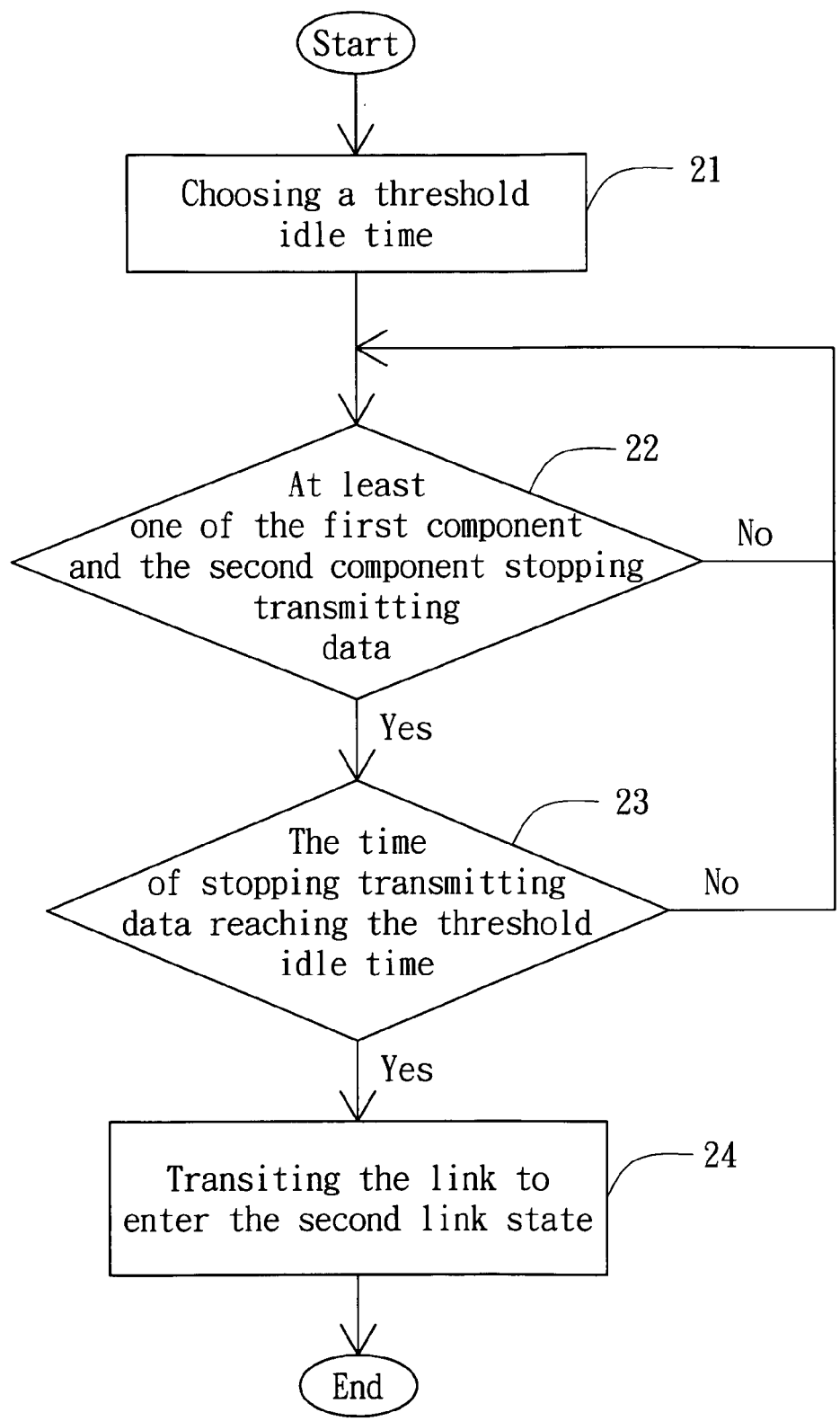
FIG. 2 is a flow chart showing a method of transitioning a link power state of the PCI Express according to the preferred embodiment of the invention.

FIG. 2 is a flow chart 200 showing a method of transiting link state of the PCI Express according to the embodiment of the invention.

This method is applied to the link 130 connected between the upstream component 110 and the downstream component 120. In step 21, a threshold idle time is defined. Next, in step 22, detecting whether at least one of the upstream component 110 and the downstream component 120 stops transmitting data when the link 130 is under a first link state.

If at least one of the upstream component 110 and the downstream component 120 stops transmitting the data which means the system is idle. In step 23, if the system is idle, determining whether the system idle time reaches the threshold idle time. If the threshold idle time is expired, transiting the link 130 into a second link state (step 24).

If a data packet has to be transmitted under the second link state, the link 130 should be transited to the first link state before transmitting the data packet. Before transiting to the first link state, the link 130 is firstly transited from the second link state to a transitional link state, then to the first link state.

In step 21, the threshold idle time could be adjusted within a range from 128 nanoseconds to 32 microseconds according to the demands. In comparing with the threshold idle time of 7 microseconds defined in the PCI Express specification, the threshold idle time of the invention is more flexible. Under different requirements, such as the different transmission frequencies, if the threshold idle time is fixed defined for transiting the system from L0 state to L0s state, the power-saving effect cannot be effectively reached. The system idle time may be defined in the condition when there has no data transmission in the transaction layer 111 of the upstream component 110, or in the data link layer 112 of the upstream component 110, or in each layer of the downstream component 120.

In step 22, the first link state may be, for example, the L0 state. In step 23, the second link state may be, for example, the L1 state or L0s state.

The L0 state is the link state in which consuming the most power. That is, the L0 state may be an active state or a normal working state, in which all data transactions on the PCI Express interface are performed.

The L0s state is the link state with a very short period in which the link 130 is briefly idle to reduce the power consumption. The transition from the L0 state to the L0s state is controlled by software. The data transmission will be blocked in the L0s state. Thus, if a data pack has to be transmitted under the L0s state, the link 130 has to return to the L0 state firstly.

The time period of the L1 state is much longer than that of the L0s state. In the L1 state, all transmission circuits are stopped, and the clock gating is generated, and all phase locked loops (PLL) are also stopped.

Figure 3:
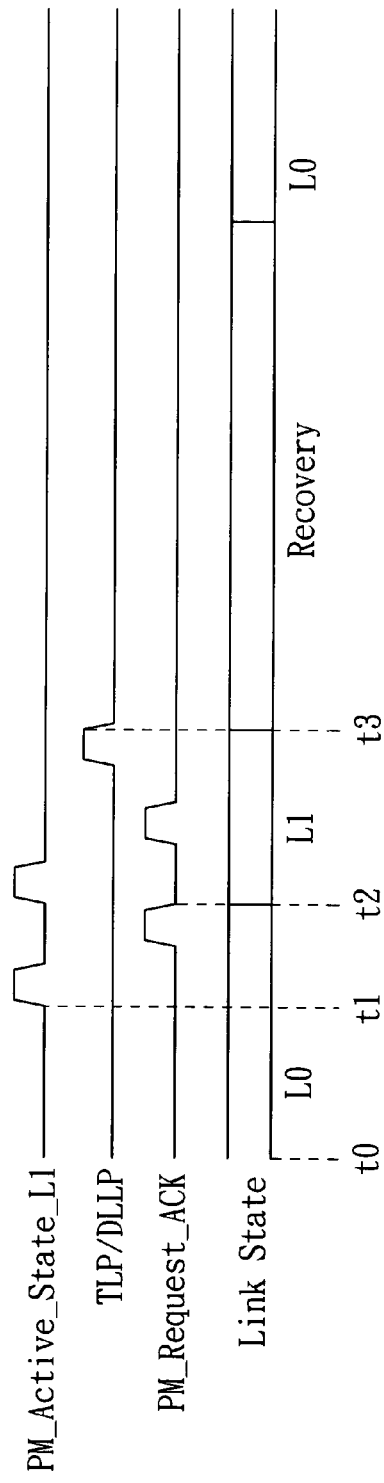
FIG. 3 shows associated waveforms when the link is transited between the L-states L0 and L1.

The procedure of an example of transiting to the L1 state will be illustrated herein below. FIG. 3 shows associated waveforms when the link is transited between the L0 state and the L1 state.

Assume the upstream component 110 is idle at the time t0. At time t1, if the threshold idle time is expired, the link 130 is transited to the L1 state. The time period between t0 and t1 is the threshold idle time selected according to the concept of the invention. At t1, the upstream component 110 continuously sends out a PM_Active_State_Request_L1 (i.e. a DLLP), If there is no TLP or DLLP transmitted, assume the upstream component 110 receives the request (i.e., PM_Request_Ack) for transiting to the L1 state at t2. After t2, the link 130 would be transited to the L1 state.

When under the L1 state, assume the upstream component 110 or the downstream component 120 generates a TLP or a DLLP at time t3, the link has to return to the L0 state for data packet transmission. Consequently, the link 130 is firstly transited to the recovery state and then transited to the L0 state after the t3.

Figure 4:
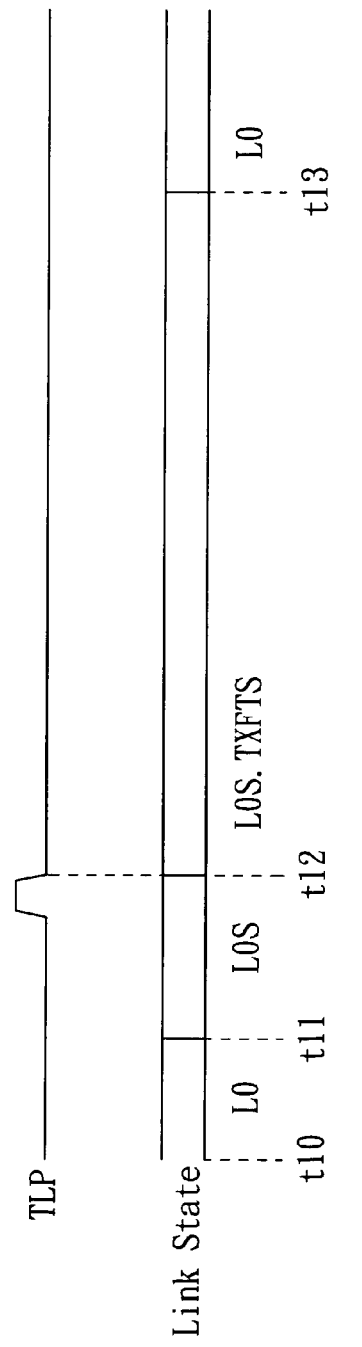
FIG. 4 shows associated waveforms when the link is transited between the L-states L0 and L0s.

FIG. 4 shows associated waveforms when the link is transited between the L0 state and L0s state. During time t10 to time t11, assume the link 130 is under L0 state, if the downstream component 120 or the upstream component 110 has no data packet to be transmitted, the link 130 is then transited to the L0s state after the time t11.

In this example, the time period between t10 and t11 is the threshold idle time selected according to the concept of the invention. Assume if there has a TLP or a DLLP to be transmitted at the time t12, the link 130 has to return to the L0 state.

Before the link 130 returns to the L0 state, the link 130 is firstly transited to the L0s state (shown as L0STXFTS in FIG. 4) at t12. Thereafter, the link 130 can return to the L0 state after the time t13.

In the method of transitioning the link state of the power state of a PCI Express system, the threshold idle time can be adjusted according to the design or the transmission speed when the system is idle under the L0 state, thus the L0s state or L1 state can be properly transited and the power consumption is reduced. The application of the adjustable threshold idle time may also support the future increase of the bandwidth or transmission speed for a longer period of time.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of transitioning link state (L-state) for a link between an upstream component and a downstream component, the method comprising:
   adjusting a threshold idle time within a range from a first idle time to a second idle time, according to a requirement of data transmission between the upstream component and the downstream component;
   detecting whether at least one of the upstream component and the downstream component stops the data transmission when the link is under a first link state, wherein the data is normally transmitted under the first link state;
   detecting whether the threshold idle time is expired when the data transmission is stopped; and
   transiting the link into a second link state when the threshold idle time is expired.

2. The method according to claim 1, wherein the first link state is a normal working state.

3. The method according to claim 1, wherein the second link state is a low power-consumption state.

4. The method according to claim 1, wherein the first link state is L0 state.

5. The method according to claim 1, wherein the second link state is L1 state.

6. The method according to claim 1, wherein the second link state is L0s state.

7. The method according to claim 1, when under the second link state, transiting the link from the second link state to the first link state before transmitting a data packet.

8. The method according to claim 7, wherein firstly transiting the link from the second link state to a transitional link state, then to the first link state.

9. The method according to claim 1, wherein the threshold idle time ranges from 128 nanoseconds to 32 microseconds.

10. The method according to claim 1, wherein the method is applied to a PCI Express system.

11. The method according to claim 1, wherein the threshold idle time is adjusted within the range according to the requirement of transmission frequency of the data transmission.

12. A data transmission system, comprising:
   an upstream component;
   a downstream component; and
   a link electrically connected between the upstream component and the downstream component, wherein the upstream component and the downstream component respectively transmit data to each other via the link under a first link state which is a normal working state;
   wherein the data transmission system adjusts a threshold idle time within a range from a first idle time to a second idle time, according to a requirement of data transmission between the upstream component and the downstream component; when a time period for which at least one of the upstream component and the downstream component stops the data transmission under the first link state reaches the threshold idle time, the link is transited to a second link state.

13. The system according to claim 12, wherein the first link state is a normal working state.

14. The system according to claim 12, wherein the second link state is a low power-consumption state.

15. The system according to claim 12, wherein the first link state is L0 state.

16. The system according to claim 12, wherein the second link state is L1 state.

17. The system according to claim 12, wherein the second link state is L0s state.

18. The system according to claim 12, when under the second link state, the link is transited from the second link state to the first link state before transmitting a data packet.

19. The system according to claim 18, wherein the link is firstly transited from the second link state to a transitional link state, then to the first link state.

20. The system according to claim 12, wherein the threshold idle time ranges from 128 nanoseconds to 32 microseconds.

21. The system according to claim 12, wherein the data transmission system is a PCI Express system.

22. The system according to claim 12, wherein the threshold idle time is adjusted within the range according to the requirement of transmission frequency of the data transmission.

* * * * *

UNITED STATES PATENT AND TRADEMARK OFFICE
CERTIFICATE OF CORRECTION

PATENT NO. : 7,647,517 B2
APPLICATION NO. : 11/403853
DATED : January 12, 2010
INVENTOR(S) : Tseng et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 619 days.

Signed and Sealed this

Twenty-eighth Day of December, 2010

David J. Kappos
*Director of the United States Patent and Trademark Office*